US012684444B2

(12) United States Patent
Shi et al.

(10) Patent No.: US 12,684,444 B2
(45) Date of Patent: Jul. 14, 2026

(54) CONVERGED NETWORK SERVICE CONTINUITY METHOD AND APPARATUS, AND COMMUNICATION DEVICE

(71) Applicants: China Mobile Communication Co., Ltd Research Institute, Beijing (CN); China Mobile Communications Group Co., Ltd., Beijing (CN)

(72) Inventors: Nanxiang Shi, Beijing (CN); Lu Lu, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 409 days.

(21) Appl. No.: 18/571,587

(22) PCT Filed: Jun. 22, 2022

(86) PCT No.: PCT/CN2022/100448
§ 371 (c)(1),
(2) Date: Dec. 18, 2023

(87) PCT Pub. No.: WO2022/268121
PCT Pub. Date: Dec. 29, 2022

(65) Prior Publication Data
US 2024/0284288 A1 Aug. 22, 2024

(30) Foreign Application Priority Data
Jun. 22, 2021 (CN) .......................... 202110691880.1

(51) Int. Cl.
| | |
|---|---|
| *H04W 36/26* | (2009.01) |
| *H04W 36/14* | (2009.01) |
(Continued)

(52) U.S. Cl.
CPC ........... *H04W 36/26* (2013.01); *H04W 36/14* (2013.01); *H04W 36/1443* (2023.05); *H04W 36/18* (2013.01); *H04W 36/302* (2023.05)

(58) Field of Classification Search
CPC ............. H04W 48/18; H04W 36/0016; H04W 36/0033; H04W 76/15; H04W 36/302;
(Continued)

(56) References Cited

U.S. PATENT DOCUMENTS

| | | | |
|---|---|---|---|
| 2007/0110009 A1 | 5/2007 | Bachmann et al. | |
| 2008/0049648 A1* | 2/2008 | Liu ......................... | H04L 65/80 370/310 |
(Continued)

FOREIGN PATENT DOCUMENTS

| | | |
|---|---|---|
| CN | 101800961 A | 8/2010 |
| CN | 102647693 A | 8/2012 |
(Continued)

OTHER PUBLICATIONS

Ericsson, "Inter Domain handover from E-UTRAN to GERAN", 3GPP TSG SA WG2 Meeting #64, S2-082272, Apr. 7-11, 2008, Jeju, South Korea.
(Continued)

*Primary Examiner* — Allahyar Kasraian
(74) *Attorney, Agent, or Firm* — Price Heneveld LLP

(57) ABSTRACT

Embodiments of the present disclosure disclose a converged network service continuity method and apparatus, and communication device. The method includes: determining, by a core network device, a service rule corresponding to a terminal, where the service rule includes an audio and/or video service processing rule with at least one of a fixed access network, a mobile access network and a satellite access network as a handover target; determining, by the core network device, when the core network device receives (Continued)

S1: handover scenario between fixed and mobile access networks
S2: handover scenario between mobile access networks
S3: handover scenario between fixed and satellite access networks
S4: handover scenario between mobile and satellite access networks
S5: handover scenario between satellite access networks an access handover event initiated by the terminal or a network device, a first handover target corresponding to the access handover event, determining a first processing rule for the first handover target based on the service rule, and performing service handover processing according to the first processing rule.

9 Claims, 4 Drawing Sheets

(51) Int. Cl.
  *H04W 36/18* (2009.01)
  *H04W 36/30* (2009.01)

(58) Field of Classification Search
  CPC . H04W 36/32; H04W 36/14; H04W 36/1443; H04W 36/26; H04W 36/144
  See application file for complete search history.

(56) References Cited

U.S. PATENT DOCUMENTS

| | | | | |
|---|---|---|---|---|
| 2009/0191858 A1* | 7/2009 | Calisti | ........... | H04L 47/762 |
| | | | | 455/422.1 |
| 2017/0311244 A1* | 10/2017 | Kodaypak | ........... | H04W 8/14 |
| 2019/0215729 A1 | 7/2019 | Oyman et al. | | |
| 2019/0364465 A1 | 11/2019 | Frankkila et al. | | |
| 2023/0180066 A1* | 6/2023 | Xie | ........... | H04W 28/0215 |
| | | | | 370/331 |

FOREIGN PATENT DOCUMENTS

| | | |
|---|---|---|
| CN | 103188745 A | 7/2013 |
| CN | 107969020 A | 4/2018 |
| CN | 110710261 A | 1/2020 |
| EP | 3627897 A1 | 3/2020 |
| JP | 2007511147 A | 4/2007 |
| WO | 2014116757 A1 | 7/2014 |

OTHER PUBLICATIONS

Xiao, Wei; et al., Computer Technology and Development, "A Study on Method to Implement VoIP System in Heterogeneous Networks", vol. 19, No. 11, Nov. 19, 2009, Beijing, China.

Nanxiang Shi China Mobile China, "Draft new Recommendation ITU-T Y.FMSC-SC: "Service continuity for fixed, mobile and satellite convergence in IMT-2020 network and beyond"; TD742/WP1", ITU-T Draft; Study Period 2021-2024; Study Group 13; Series TD742/WP1, International Telecommunication Union, Virtual, Mar. 1-12, 2021.

European Search Report of Application No. 22827613.5 completed Sep. 2, 2025, 22 pages.

"User Group; End-to-end QoS management at the Network Interfaces; Part 1: User's E2E QoS - Analysis of the NGN interfaces (user case)", Technical Report, European Telecommunications Standards Institute, ETSI TR 102 805-1 V1.1.1, France, Nov. 1, 2009.

Monique Calisti et al: "Enabling Adaptive Service Access Management for Next Generation Mult-Service Networks", Universal Multiservice Networks, 2007. ECUMN '07. Fourth European Conference on, IEEE, PI, Feb. 1, 2007.

Hughes/Echostar, Network Systems, Thales, BT PLC, Turkcell, Vodafone, ESA, Inmarsat, "Service continuity between NTN and TN", 3GPP TSG-RAN WG2 Meeting #113-e, R2-2105006, Online, Apr. 12-20, 2021.

* cited by examiner

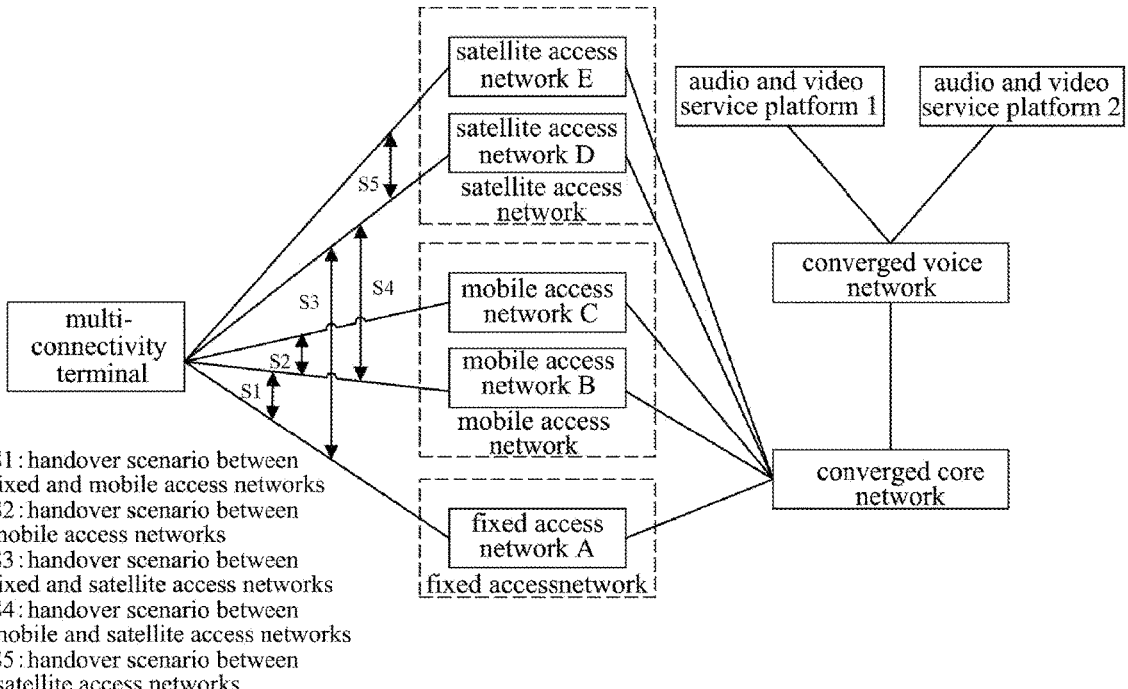

S1 : handover scenario between
fixed and mobile access networks
S2 : handover scenario between
mobile access networks
S3 : handover scenario between
fixed and satellite access networks
S4 : handover scenario between
mobile and satellite access networks
S5 : handover scenario between
satellite access networks

Fig. 1 determining, by core network device, service rule corresponding to terminal; wherethe service rule includes an audio and/or video service processing rule with at least one of a fixed access network, a mobile access network and a satellite access network as a handover target          101 determining, when receiving an access handover event initiated by the terminal or a network device, a first handover target corresponding to the access handover event, determining a first processing rule for the first handover target based on the service rules, and performing service handover processing according to the first processing rule          102

CONVERGED NETWORK SERVICE CONTINUITY METHOD AND APPARATUS, AND COMMUNICATION DEVICE

CROSS-REFERENCE TO RELATED APPLICATION

The present disclosure is the U.S. national phase of PCT Application PCT/CN2022/100448 filed on Jun. 22, 2022, which claims priority to the Chinese patent application No. 202110691880.1 filed in China on Jun. 22, 2021, a disclosure of which is incorporated herein by reference in its entirety.

TECHNICAL FIELD

The present disclosure relates to the field of communication technologies, in particular to a service continuity method and apparatus for converged network, and communication device.

BACKGROUND

Communication capabilities of satellite networks significantly improve in terms of rate, delay, and reliability and can complement and coordinate with terrestrial fixed/mobile networks. In some application scenarios, terrestrial networks even can be replaced. Fixed, mobile, and satellite converged networks support voice, video, messaging, data, broadcast/ multicast, and other communication services for multi- connectivity terminal users under any two or all three access methods of fixed access, mobile access, and satellite access.

Service continuity refers to a method of maintaining continuous use of multi-connectivity terminal services when a connectivity handover is initiated on the network side or user side. At present, a service continuity method is proposed in fixed and mobile converged networks, but a service continuity method for fixed, mobile, and satellite converged networks is not proposed.

SUMMARY

Embodiments of the present disclosure provide a converged network service continuity method and apparatus, and communication device.

The technical solution of the embodiments of the present disclosure is implemented as follows.

In a first aspect, an embodiment of the present disclosure provides a converged network service continuity method. The method includes:

determining, by a core network device, a service rule corresponding to a terminal; where the service rule includes an audio and/or video service processing rule with at least one of a fixed access network, a mobile access network and a satellite access network as a handover target;

determining, by the core network device, when the core network device receives an access handover event initiated by the terminal or a network device, a first handover target corresponding to the access handover event, determining a first processing rule for the first handover target based on the service rules, and performing service handover processing according to the first processing rule.

In some optional embodiments of the present disclosure, the performing the service handover processing according to the first processing rule includes:

2 generating, by the core network device, a service handover instruction based on the first processing rule, sending the service handover instruction to a voice network device, and sending the service handover instruction to the terminal.

In some optional embodiments of the present disclosure, the determining, by the core network device, the service rule corresponding to the terminal includes:

receiving, by the core network device, setting information from the terminal via the voice network device, wherein the setting information includes at least one of the following information: a set of first voice communication capability ratings characterizing that users accept, a set of first video communication capability ratings characterizing that users accept, priority information of voice and video communication capability ratings, and information characterizing whether an access type is maintained;

obtaining, by the core network device, connectivity-related information of the terminal; wherein the connectivity-related information includes connectivity types and connectivity rate information corresponding to the connectivity types;

determining, by the core network device, the service rule based on the connectivity-related information and the setting information.

In some optional embodiments of the present disclosure, the set of first voice communication capability ratings includes one or more voice communication capability ratings; a voice communication capability supported by the terminal is pre-divided into multiple voice communication capability ratings.

In some optional embodiments of the present disclosure, the set of first video communication capability ratings includes one or more video communication capability ratings; a video communication capability supported by the terminal is pre-divided into multiple video communication capability ratings.

In some optional embodiments of the present disclosure, the connectivity types include: a fixed access network connection, a mobile access network connection or a satellite access network connection.

In some optional embodiments of the present disclosure, the determining, by the core network device, the service rule based on the connectivity-related information and the setting information includes:

determining, by the core network device, the following processing rules based on the connectivity type, the connectivity rate information corresponding to the connectivity type, and the setting information:

audio communication capability ratings or video communication capability ratings when a handover target is a fixed access network;

audio communication capability ratings or video communication capability ratings when a handover target is a mobile access network;

audio communication capability ratings or video communication capability ratings when a handover target is a satellite access network.

In some optional embodiments of the present disclosure, the service handover instruction at least includes a first audio communication capability rating or a first video communication capability rating corresponding to the first handover target; the first audio communication capability rating or the first video communication capability rating is used to instruct a media service platform and the terminal to communicate.

In a second aspect, an embodiment of the present disclosure further provides a converged network service continuity method. The method includes:

receiving, by a voice network device, setting information from a terminal, where the setting information includes at least one of the following information: a set of first voice communication capability ratings characterizing that users accept, a set of first video communication capability ratings characterizing that users accept, priority information of voice and video communication capability ratings, and information characterizing whether an access type is maintained; the setting information is used to determine a service rule for guiding service handover processing;

sending, by the voice network device, the setting information to a core network device.

In some optional embodiments of the present disclosure, the method further includes: receiving, by the voice network device, a service handover instruction from the core network device, and sending the service handover instruction to a media service platform.

In some optional embodiments of the present disclosure, before the voice network device receives the setting information from the terminal, the method further includes: dividing, by the voice network device, a voice communication capability into multiple voice communication capability ratings based on a media type and a rate rating, and dividing a video communication capability into multiple video communication capability ratings.

In some optional embodiments of the present disclosure, the set of first voice communication capability ratings includes one or more voice communication capability ratings; the set of first video communication capability ratings includes one or more video communication capability ratings.

In some optional embodiments of the present disclosure, the service rule includes the following processing rules:

audio communication capability ratings or video communication capability ratings when a handover target of the terminal is a fixed access network;

audio communication capability ratings or video communication capability ratings when a handover target of the terminal is a mobile access network;

audio communication capability ratings or video communication capability ratings when a handover target of the terminal is a satellite access network.

In some optional embodiments of the present disclosure, the service handover instruction at least includes: when the handover target of the terminal is a first handover target, a first audio communication capability rating or a first video communication capability rating corresponding to the first handover target; the first audio communication capability rating or the first video communication capability rating corresponding to the first handover target is used to instruct the media service platform to communicate.

In a third aspect, an embodiment of the present disclosure further provides a converged network service continuity apparatus. The apparatus includes: a first determining unit, a first receiving unit, a second determining unit, and a service handover unit; wherein the first determining unit is configured to determine a service rule corresponding to a terminal; where the service rule includes an audio and/or video service processing rule with at least one of a fixed access network, a mobile access network and a satellite access network as a handover target;

the first receiving unit is configured to receive an access handover event initiated by the terminal or a network device;

the second determining unit is configured to determine a first handover target corresponding to the access handover event when the first receiving unit receives the access handover event initiated by the terminal or the network device, and to determine a first processing rule for the first handover target based on the service rule;

the service handover unit is configured to perform service handover processing according to the first processing rule.

In a fourth aspect, an embodiment of the present disclosure further provides a converged network service continuity apparatus. The apparatus includes: a second receiving unit and a second sending unit; wherein the second receiving unit is configured to receive setting information from a terminal, where the setting information includes at least one of the following information: a set of first voice communication capability ratings characterizing that users accept, a set of first video communication capability ratings characterizing that users accept, priority information of voice and video communication capability ratings, and information characterizing whether an access type is maintained; the setting information is used to determine a service rule for guiding service handover processing;

the second sending unit is configured to send the setting information to a core network device.

In a fifth aspect, an embodiment of the present disclosure further provides a computer-readable storage medium storing therein a computer program, where the computer program is configured to be executed by a processor, to implement the steps of the method according to the first aspect or to implement the steps of the method according to the second aspect.

In a sixth aspect, an embodiment of the present disclosure further provides a communication device, including a memory, a processor, and a program stored in the memory and capable of running on the processor, where the processor is configured to execute the program, to implement the steps of the method according to the first aspect or to implement the steps of the method according to the second aspect.

According to the converged network service continuity method and apparatus, and communication device provided by embodiments of the present disclosure, the core network device determines the service rule corresponding to the terminal. The service rule includes an audio and/or video service processing rule with at least one of a fixed access network, a mobile access network and a satellite access network as a handover target. When the core network device receives the access handover event initiated by the terminal or the network device, the first handover target corresponding to the access handover event is determined. The first processing rule for the first handover target is determined based on the service rules and the service handover processing is performed according to the first processing rule. By adopting the technical solution of the embodiments of the present disclosure, service continuity in scenarios such as handover between fixed and mobile access networks, handover between mobile access networks, handover between fixed access networks and satellite access networks, handover between mobile access networks and satellite access networks, and handover between satellite access networks in fixed, mobile, and satellite converged networks, is achieved.

BRIEF DESCRIPTION OF THE DRAWINGS

FIG. 1 is an architectural schematic diagram of a converged network according to an embodiment of the present disclosure;

FIG. 2 is a first schematic flowchart of a converged network service continuity method according to an embodiment of the present disclosure;

DETAILED DESCRIPTION

Figure 3:
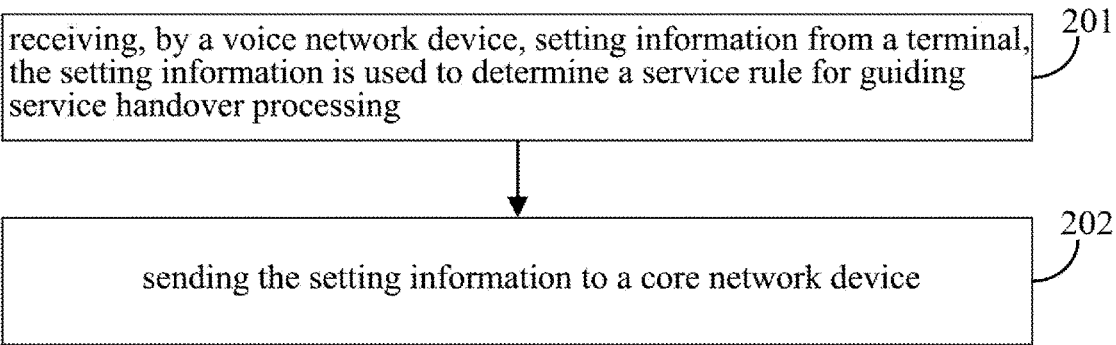
FIG. 3 is a second schematic flowchart of a converged network service continuity method according to an embodiment of the present disclosure.

The present disclosure will be described in further detail hereinafter with reference to the accompanying drawings and specific embodiments.

FIG. 1 is an architectural schematic diagram of a converged network according to an embodiment of the present disclosure. As shown in FIG. 1, the converged network applied in an embodiment of the present disclosure includes: multi-connectivity terminals (also referred to as terminals, terminal devices, communication terminals, etc.), access networks, converged core networks (also referred to as core networks), converged voice networks (also referred to as voice networks), and audio and video service platforms (also referred to as media service platforms, service platforms, etc.).

The access network includes at least two types of access networks among fixed access networks, mobile access networks, and satellite access networks. Each type of access network may also be divided into multiple access networks according to different frequency ranges. For example, as shown in FIG. 1, the satellite access network can include satellite access network D and satellite access network E; and the mobile access network can include mobile access network B and mobile access network C. It is to be noted that the number of access networks in FIG. 1 is only an example for scenario description, and the number of access networks in each type of access network in actual applications is not limited to those shown in FIG. 1.

The multi-connectivity terminals in the present embodiment support fixed, mobile, and satellite multi-connectivity capabilities, support handover between fixed and mobile access networks, handover between mobile access networks, handover between fixed and satellite access networks, handover between mobile and satellite access networks, etc. The multi-connectivity terminals support multiple voice/video codecs and multiple voice/video rate ratings, and support handover between voice calls and video calls, as well as handover between multiple codec/rate rating voice calls and handover between multiple codec/rate rating video calls.

Exemplarily, the access device of the mobile access network can be a base station under the communication network of the global system of mobile communication (GSM), code division multiple access (CDMA) system, long term evolution (LTE) system, or 5G system, etc. The 5G system can also be referred to as a new radio (NR) system.

The audio and video service platform provides audio and video services and value-added audio and video services (such as supplementary services, intelligent network, color ring back tone, etc.), supports multiple voice/video codecs and multiple voice/video rate ratings, and supports handover between voice calls and video calls, as well as handover between multiple codec/rate rating voice calls and handover between multiple codec/rate rating video calls.

Service continuity refers to a method of maintaining continuous use of multi-connectivity terminal services when a connectivity handover is initiated on the network side or user side. Since the 3G era, audio and video service continuity is an important technical direction in the field of communication. Entering the 4G/5G era, the rapid development of voice over long-term evolution (VOLTE)/voice over new radio (VoNR) services puts forward higher requirements for audio and video service continuity. Audio and video service continuity becomes an important part of guaranteeing the audio and video service quality and experience quality of users, and has important practical significance. Facing the demand for multi-access convergence services, it is of important application value to achieve audio and video service continuity in fixed, mobile, and satellite converged networks, which is the basis for guaranteeing the audio and video service quality and experience quality of multi-connectivity terminal users.

The service continuity in the present embodiment includes at least one of the scenarios shown in FIG. 1, which are targeted at S1: handover scenario between fixed and mobile access networks, S2: handover scenario between mobile access networks, S3: handover scenario between fixed and satellite access networks, S4: handover scenario between mobile and satellite access networks, S5: handover scenario between satellite access networks.

Based at least on the scenario shown in FIG. 1, the following embodiments of the present disclosure are provided.

An embodiment of the present disclosure provides a converged network service continuity method. FIG. 2 is a first schematic flowchart of a converged network service continuity method according to an embodiment of the present disclosure. As shown in FIG. 2, the method includes:

Step 101: determining, by a core network device, a service rule corresponding to a terminal; where the service rule includes an audio and/or video service processing rule with at least one of a fixed access network, a mobile access network and a satellite access network as a handover target;

Step 102: determining, by the core network device when the core network device receives an access handover event initiated by the terminal or a network device, a first handover target corresponding to the access handover event, determining a first processing rule for the first handover target based on the service rule, and performing service handover processing according to the first processing rule.

In each embodiment of the present disclosure, the service rule can also be referred to as a rule, policy, service policy, etc. The present embodiment does not limit the name of the service rule, as long as the function of the service rule can be implemented. Exemplarily, the service rule is used to represent the processing rule, processing method, or processing strategy of audio and/or video services when the handover target is at least one of the following: fixed access network, mobile access network, and satellite access network. The handover target can also be referred to as the handover object, etc., indicating the access network to be handed over and accessed by the terminal when the terminal experiences an access handover event. The present embodiment does not limit the name of the handover target.

In the present embodiment, the service rule includes the processing rule of the audio and/or video service corresponding to the handover target. Exemplarily, the service rule includes the processing rule of the audio service corresponding to the handover target, or includes the processing rule of the video service corresponding to the handover target, or includes the processing rule of the audio service and video service corresponding to the handover target, etc.

Exemplarily, the processing rule includes the handover target, and the corresponding voice and/or video communication capability rating or voice and/or video rate rating, etc. When the core network device receives an access handover event initiated by the terminal or network device, that is, when it is determined that the access type or connectivity type of the terminal changes, it is determined that the first handover target corresponding to the access handover event is at least one of a fixed access network, a mobile access network, or a satellite access network, and then the first processing rule for the first handover target is determined based on the service rule, and the service handover processing is performed according to the first processing rule.

The access handover event is not limited to the handover between access networks, such as the handover between fixed access networks and mobile access networks, or the handover between mobile access networks and satellite access networks, or the handover between fixed access networks and satellite access networks. The access handover event can also be a handover within an access network, such as the handover between satellite access network D and satellite access network E shown in FIG. 1, and the handover between mobile access network B and mobile access network C, etc.

In some optional embodiments, the access handover event can be initiated by the terminal, and then the core network device receives a message or signaling characterizing the access handover event from the terminal. In other optional embodiments, the access handover event can be initiated by the network device, and then the core network device receives a message or signaling characterizing the access handover event from the network device. The access handover event can correspond to one or more terminal devices.

In some optional embodiments of the present disclosure, the core network device determining the service rule corresponding to the terminal includes: receiving, by the core network device, setting information from the terminal via the voice network device, where the setting information includes at least one of the following information: a set of first voice communication capability ratings characterizing that users can accept, a set of first video communication capability ratings characterizing that users can accept, priority information of voice and video communication capability ratings, and information characterizing whether an access type is maintained; obtaining, by the core network device, connectivity-related information of the terminal; where the connectivity-related information includes connectivity types and connectivity rate information corresponding to the connectivity types; determining, by the core network device, the service rule based on the connectivity-related information and the setting information.

In the present embodiment, users manually configure the foregoing setting information on the terminal. The setting information can also be referred to as configuration information, which represents the user's preference for audio and video calls when performing audio and video services. The present embodiment does not limit the name of the setting information. The setting information can include a set of first voice communication capability ratings characterizing that users can accept, that is, within the range of audio and video communication capabilities of the multi-connectivity terminal, the voice communication capability rating that the users can accept. The setting information can also include a set of first video communication capability ratings characterizing that users can accept, that is, within the range of audio and video communication capabilities of the multi-connectivity terminal, the video communication capability rating that the users can accept. The setting information can also include priority information of each voice/video capability rating. For example, the priority is sorted from high to low as Video Class 3, Video Class 2, Voice Class 3, Voice Class 2, etc. The setting information can also include information characterizing whether an access type is maintained, also referred to as the media type maintenance option. When the media type maintenance option is turned on, the media type is preferably kept unchanged during the handover, that is, the information characterizing the maintenance of the access type. If the call is initiated by voice, then the voice call is preferably maintained after the connectivity handover, if the call is initiated by video, then the video call is preferably maintained after the connectivity handover. When the media type maintenance option is turned off, the media type is not preferably kept unchanged during the handover, that is, the information characterizing the non-maintenance of the access type. The voice network device receives the foregoing setting information from the terminal, saves the setting information, and sends the setting information to the core network device.

In the present embodiment, the connectivity-related information of the terminal includes the connectivity type of the terminal and/or the typical value of the connectivity rate. Exemplarily, the typical value of the connectivity rate is the experience data of the connectivity rate of the terminal using the corresponding connectivity type in the network environment where the terminal is located. The core network device determines the service rule based on the setting information and the connectivity-related information of the terminal, for the connectivity handover initiated by the terminal side and the connectivity handover initiated by the network side.

In some optional embodiments, the set of first voice communication capability ratings includes one or more voice communication capability ratings; the voice communication capability supported by the terminal is pre-divided into multiple voice communication capability ratings. The set of first video communication capability ratings includes one or more video communication capability ratings; the video communication capability supported by the terminal is pre-divided into multiple video communication capability ratings.

Exemplarily, the set of first voice communication capability ratings includes multiple voice communication capability ratings, such as including: Voice Class 1 (corresponding to low-speed voice communication capability rating), Voice Class 2 (corresponding to medium-speed voice communication capability rating), Voice Class 3 (corresponding to high-speed voice communication capability rating). Exemplarily, the set of first video communication capability ratings includes multiple voice communication capability ratings, such as including: Video Class 1 (corresponding to low-speed video communication capability rating), Video Class 2 (corresponding to medium-speed video communication capability rating), Video Class 3 (corresponding to high-speed video communication capability rating).

In some optional embodiments, the connectivity type includes: fixed access network connection, mobile access network connection, or satellite access network connection. In the present embodiment, the connectivity type characterizes the current connectivity type or access type of the terminal.

In some optional embodiments of the present disclosure, the core network device determining the service rule based on the connectivity-related information and the setting information, includes: determining, by the core network device, the following processing rules based on the connectivity type, the connectivity rate information corresponding to the connectivity type, and the setting information:

audio communication capability ratings or video communication capability ratings when a handover target is a fixed access network;

audio communication capability ratings or video communication capability ratings when a handover target is a mobile access network;

audio communication capability ratings or video communication capability ratings when a handover target is a satellite access network.

Exemplarily, Terminal 1's communication capabilities include: Voice Class 1, Voice Class 2, Voice Class 3, Video Class 1, Video Class 2, and Video Class 3. Terminal 1's setting information includes: user-acceptable voice communication capability ratings including: Voice Class 1, Voice Class 2, Voice Class 3; user-acceptable video communication capability ratings including Video Class 2, Video Class 3; the priority information of each voice/video capability rating being: Video Class 3, Video Class 2, Voice Class 3, Voice Class 2, Voice Class 1 (sorted from high to low); the media type maintenance option being off (i.e., characterizing the non-maintenance of the access type).

Terminal 2's communication capabilities include: Voice Class 1, Voice Class 2, Video Class 1, Video Class 2. Terminal 2's setting information includes: user-acceptable voice communication capability ratings including: Voice Class 1, Voice Class 2, user-acceptable video communication capability ratings including: Video Class 1, Video Class 2, the priority information of each voice/video capability rating being: Voice Class 2, Voice Class 1, Video Class 2, Video Class 1 (sorted from high to low); the media type maintenance option being on (i.e., characterizing the maintenance of the access type).

Terminal 1 supports fixed access network, 2G mobile access network, 4G mobile access network, 5G mobile access network, and satellite access network. The typical value of fixed access rate is 100 Mbit/s downstream and 20 Mbit/s upstream; the typical value of 2G mobile access rate is 200 Kbit/s downstream and 60 Kbit/s upstream; the typical value of 4G mobile access rate is 40 Mbit/s downstream and 8 Mbit/s upstream; the typical value of 5G mobile access rate is 300 Mbit/s downstream and 60 Mbit/s upstream; the typical value of satellite access rate is 5 Mbit/s downstream and 500 Kbit/s upstream. Based on User 1's setting information, the service rules for Terminal 1 are as follows:

the handover target is fixed access: maintaining or handing over to Video Class 3;

the handover target is 2G mobile access: maintaining or handing over to Voice Class 1;

the handover target is 4G mobile access: maintaining or handing over to Video Class 2;

the handover target is 5G mobile access: maintaining or handing over to Video Class 3;

the handover target is satellite access: maintaining or handing over to Voice Class 3.

Terminal 2 supports fixed access network, 2G mobile access network, 4G mobile access network, and satellite access network. The typical value of fixed access rate is 40 Mbit/s downstream and 8 Mbit/s upstream; the typical value of 2G mobile access rate is 200 Kbit/s downstream and 60 Kbit/s upstream; the typical value of 4G mobile access rate is 20 Mbit/s downstream and 4 Mbit/s upstream; the typical value of satellite access rate is 500 Kbit/s downstream and 50 Kbit/s upstream. Based on User 2's setting information, the service rules for Terminal 2 are as follows:

the handover target is fixed access: if the call is initiated by voice, Voice Class 2 is maintained or handed over to; if the call is initiated by video, Video Class 2 is maintained or handed over to.

the handover target is 2G mobile access: if the call is initiated by voice, Voice Class 1 is maintained or handed over to; if the call is initiated by video, Voice Class 1 is maintained or handed over to.

the handover target is 4G mobile access: if the call is initiated by voice, Voice Class 2 is maintained or handed over to; if the call is initiated by video, Video Class 2 is maintained or handed over to.

the handover target is satellite access: if the call is initiated by voice, Voice Class 1 is maintained or handed over to; if the call is initiated by video, Voice Class 1 is maintained or handed over to.

In some optional embodiments disclosed, the performing the service handover processing according to the first processing rule, includes: generating, by the core network device, a service handover instruction based on the first processing rule, sending the service handover instruction to a voice network device, and sending the service handover instruction to the terminal.

In the present embodiment, when a connectivity handover is initiated on the user side or network side, the core network device receives an access handover event of the terminal, a first handover target corresponding to the access handover event is determined, a first processing rule for the first handover target is determined based on the service rules, and a service handover instruction is generated according to the first processing rule.

Optionally, the service handover instruction at least includes a first audio communication capability rating or a first video communication capability rating corresponding to the first handover target; the first audio communication capability rating or the first video communication capability rating is used to instruct the media service platform and the terminal to communicate.

Optionally, a service handover unit in the core network device is configured to perform related operations such as determining the service rule and service handover. Exemplarily, the service handover unit can be deployed in existing network functions (such as 5G PCF/IMT-2020 PCF), or can also be a new network function and support synchronizing related information such as the terminal's connectivity type and typical value of the connectivity rate with the terminal.

Based on the foregoing embodiments, an embodiment of the present disclosure further provides a converged network service continuity method. FIG. 3 is a second schematic flowchart of a converged network service continuity method according to an embodiment of the present disclosure. As shown in FIG. 3, the method includes:

Step 201: receiving, by a voice network device, setting information from a terminal, where the setting information includes at least one of the following information: a set of first voice communication capability ratings characterizing that users can accept, a set of first video communication capability ratings characterizing that users can accept, priority information of voice and video communication capability ratings, and information characterizing whether an access type is maintained; the setting information is used to determine a service rule for guiding service handover processing;

Step 202: sending, by the voice network device, the setting information to a core network device.

In the present embodiment, users manually configure the foregoing setting information on the terminal. The setting information can also be referred to as configuration information, which represents the user's preference for audio and video calls when performing audio and video services. The setting information can include a set of first voice communication capability ratings characterizing that users can accept, that is, within the range of audio and video communication capabilities of the terminal, the voice communication capability rating that the users can accept. The setting information can also include a set of first video communication capability ratings characterizing that users can accept, that is, within the range of audio and video communication capabilities of the terminal, the video communication capability rating that the users can accept. The setting information can also include priority information of each voice/video capability rating. For example, the priority is sorted from high to low as Video Class 3, Video Class 2, Voice Class 3, Voice Class 2, etc. The setting information can also include information characterizing whether an access type is maintained, also referred to as the media type maintenance option. When the media type maintenance option is turned on, the media type is preferably kept unchanged during the handover, that is, the information characterizing the maintenance of the access type. If the call is initiated by voice, then the voice call is preferably maintained after the connectivity handover, if the call is initiated by video, then the video call is preferably maintained after the connectivity handover. When the media type maintenance option is turned off, the media type is not preferably kept unchanged during the handover, that is, the information characterizing the non-maintenance of the access type.

In the present embodiment, the voice network device receives the foregoing setting information from the terminal through any access network (fixed access network, mobile access network, or satellite access network) and the core network. The voice network device receives the foregoing setting information from the terminal, saves the setting information, and sends the setting information to the core network device. Specifically, the voice network device includes a service capability unit that can save the foregoing setting information. Optionally, the users can update the foregoing setting information at any time through the terminal, and synchronize the updated setting information to the voice network device through any access network and core network, and update the storage in the service capability unit.

Exemplarily, the service capability unit is configured to perform related operations of the foregoing setting information. The service capability unit can be deployed in existing network functions (such as interrogating/serving call session control Function (I/S-CSCF)), can also be a new network function and support synchronizing the foregoing setting information configuration with the terminal.

In some optional embodiments of the present disclosure, before the voice network device receives the setting information from the terminal, the method further includes: dividing, by the voice network device, a voice communication capability into multiple voice communication capability ratings based on a media type and a rate rating, and dividing a video communication capability into multiple video communication capability ratings.

In the present embodiment, considering the differences in communication capabilities and communication resources of fixed access networks, mobile access networks, and satellite access networks, as well as the support capabilities of different multi-connectivity terminals and media service platforms for voice/video codecs and voice/video rate ratings, fixed, mobile, and satellite converged networks need to support multiple voice/video codecs and multiple voice/video rate ratings. The voice network device divides the voice communication capability and video communication capability into ratings according to the media type and rate rating.

Optionally, the set of first voice communication capability ratings includes one or more voice communication capability ratings; the set of first video communication capability ratings includes one or more video communication capability ratings.

Exemplarily, the set of first voice communication capability ratings includes multiple voice communication capability ratings, such as including: Voice Class 1 (corresponding to low-speed voice communication capability rating), Voice Class 2 (corresponding to medium-speed voice communication capability rating), Voice Class 3 (corresponding to high-speed voice communication capability rating). Exemplarily, the set of first video communication capability ratings includes multiple voice communication capability ratings, such as including: Video Class 1 (corresponding to low-speed video communication capability rating), Video Class 2 (corresponding to medium-speed video communication capability rating), Video Class 3 (corresponding to high-speed video communication capability rating).

In some embodiments, the voice network device synchronizes the divided multiple voice communication capability ratings and multiple video communication capability ratings to the terminal in advance, or the terminal pre-writes the foregoing multiple voice communication capability ratings and multiple video communication capability ratings, so as to facilitate users to configure the foregoing setting information on the terminal. In other embodiments, when or before the users configure the foregoing setting information through the terminal, the terminal can establish a connection with the voice network device, obtain the multiple voice communication capability ratings and multiple video communication capability ratings pre-divided by the voice network device.

In some optional embodiments of the present disclosure, the service rule includes the following processing rules: audio communication capability ratings or video communication capability ratings when a handover target of the terminal is a fixed access network; audio communication capability ratings or video communication capability ratings when a handover target of the terminal is a mobile access network; audio communication capability ratings or video communication capability ratings when a handover target of the terminal is a satellite access network.

In some optional embodiments of the present disclosure, the method further includes: receiving, by the voice network device, a service handover instruction from the core network device, and sending the service handover instruction to a media service platform.

Optionally, the service handover instruction at least includes: when the handover target of the terminal is a first handover target, a first audio communication capability rating or a first video communication capability rating corresponding to the first handover target; where the first audio communication capability rating or the first video communication capability rating corresponding to the first handover target is used to instruct the media service platform to communicate.

By adopting the technical solution of the embodiments of the present disclosure, service continuity in scenarios such as handover between fixed and mobile access networks, handover between mobile access networks, handover between fixed access networks and satellite access networks, handover between mobile access networks and satellite access networks, and handover between satellite access networks in fixed, mobile, and satellite converged networks, is achieved.

In a second aspect, the present embodiment can select the optimal media type in each handover scenario according to the user's preference settings. When the terminal hands over to satellite access, 2G mobile access, or is in a weak coverage area, the video call can be handed over to an audio call actively.

In a third aspect, the present embodiment can select the optimal rate rating in each handover scenario according to the user's preference. When the terminal hands over to satellite access, 2G mobile access, or is in a weak coverage area, the high-rate call can be handed over to a low-rate call actively.

In a fourth aspect, the present embodiment can generate a service handover instruction according to the handover scenario and the service rule, and perform the service continuity operation during the handover based on the service handover instruction, thereby effectively reducing the information interaction between the terminal, the voice network, and the media service platform during the service handover.

The converged network service continuity method of the present embodiment will be described below with reference to specific examples.

Figure 4:
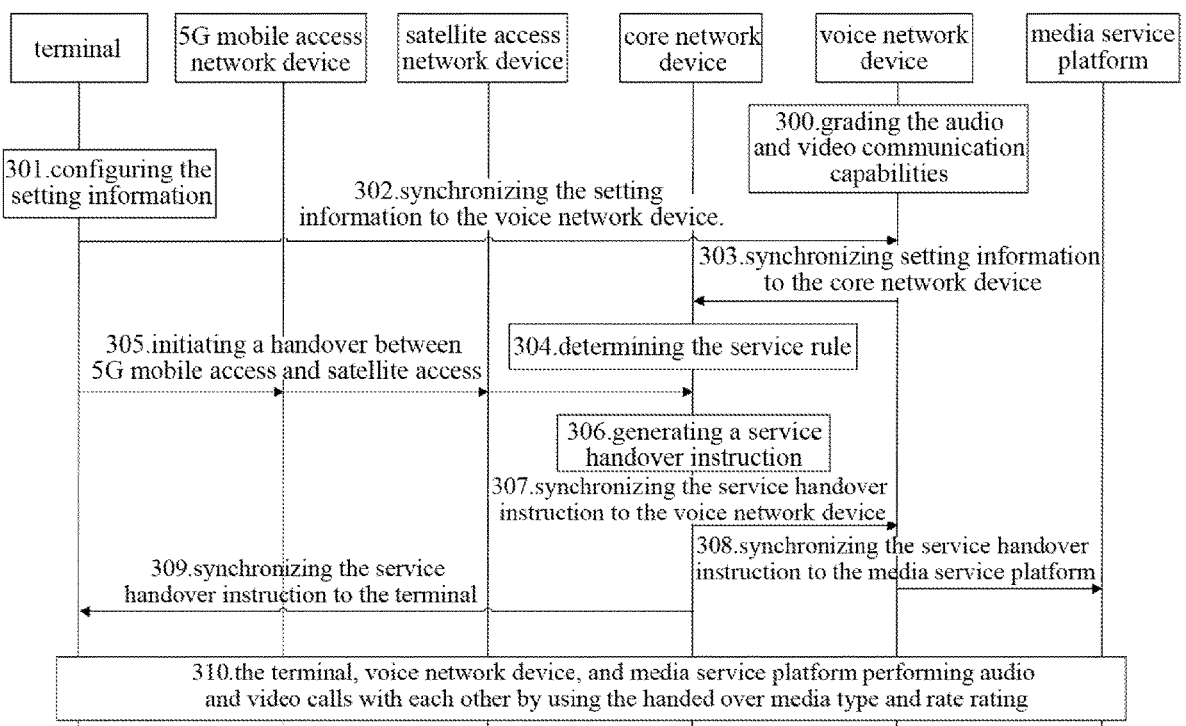
FIG. 4 is a schematic flowchart showing interaction of a converged network service continuity method according to an embodiment of the present disclosure.

FIG. 4 is a schematic flowchart showing interaction of a converged network service continuity method according to an embodiment of the present disclosure. As shown in FIG. 4, the method includes:

Step 300: grading, by a voice network device, audio and video communication capabilities based on a media type and a rate rating.

Here, a service capability unit in the voice network device grades the audio and video communication capabilities based on the media type and rate rating. Specifically, the voice communication capability can be divided into multiple voice communication capability ratings and the video communication capability can be divided into multiple video communication capability ratings.

For example, voice communication capability can be divided into: Voice Class 1 (corresponding to low-speed voice communication capability rating), Voice Class 2 (corresponding to medium-speed voice communication capability rating), Voice Class 3 (corresponding to high-speed voice communication capability rating). Video communication capability ratings can be divided into: Video Class 1 (corresponding to low-speed video communication capability rating), Video Class 2 (corresponding to medium-speed video communication capability rating), Video Class 3 (corresponding to high-speed video communication capability rating).

Step 301: configuring, by a user, the setting information on the terminal, that is, the user's preference for audio and video calls.

Here, the setting information includes: a set of first voice communication capability ratings characterizing that users can accept (that is, within the range of audio and video communication capabilities of the terminal, the voice communication capability rating that the users can accept), a set of first video communication capability ratings characterizing that users can accept (that is, within the range of audio and video communication capabilities of the terminal, the video communication capability rating that the users can accept), priority information of audio and video communication capabilities ratings and information characterizing whether an access type is maintained.

Step 302: synchronizing, by the terminal, the setting information to the voice network device.

Here, the service capability unit of the voice network device obtains the setting information and saves the setting information.

Step 303: synchronizing, by the voice network device, the setting information to the core network device.

Here, the service capability unit of the voice network device synchronizes the setting information to the service handover unit of the core network device.

Step 304: determining, by the core network device, the service rule based on the connectivity type of the terminal and the typical value of the connectivity rate of the terminal, as well as the setting information.

Here, the service handover unit of the core network device maps the setting information to the service rule based on the connectivity type of the terminal and the typical value of the connectivity rate of the terminal.

Exemplarily, the communication capability of the terminal includes: Voice Class 1, Voice Class 2, Voice Class 3, Video Class 1, Video Class 2, and Video Class 3. The setting information of the terminal includes: the voice communication capability ratings that the users can accept including: Voice Class 1, Voice Class 2, Voice Class 3; the video communication capability ratings that the users can accept including Video Class 2, Video Class 3; the priority information of each voice/video capability rating being: Video Class 3, Video Class 2, Voice Class 3, Voice Class 2, Voice Class 1 (sorted from high to low); the media type maintenance option being off (i.e., the information characterizing the non-maintenance of the access type).

The terminal supports fixed access network, 2G mobile access network, 4G mobile access network, 5G mobile access network, and satellite access network. The typical value of fixed access rate is 100 Mbit/s downstream and 20 Mbit/s upstream; the typical value of 2G mobile access rate is 200 Kbit/s downstream and 60 Kbit/s upstream; the typical value of 4G mobile access rate is 40 Mbit/s downstream and 8 Mbit/s upstream; the typical value of 5G mobile access rate is 300 Mbit/s downstream and 60 Mbit/s upstream; the typical value of satellite access rate is 5 Mbit/s downstream and 500 Kbit/s upstream. Based on the user's setting information, the service rules for the terminal are as follows:

the handover target is fixed access: maintaining or hand-
ing over to Video Class 3;

the handover target is 2G mobile access: maintaining or
handing over to Voice Class 1;

the handover target is 4G mobile access: maintaining or
handing over to Video Class 2;

the handover target is 5G mobile access: maintaining or
handing over to Video Class 3;

the handover target is satellite access: maintaining or
handing over to Voice Class 3.

Step 305: initiating, by the terminal, a handover between
5G mobile access and satellite access, and receiving, by the
core network device, the event corresponding to the con-
nectivity handover.

Step 306: determining, by the core network device, the
handover target to be the satellite access network based on
the event corresponding to the connectivity handover, deter-
mining the first processing rule based on the handover target
being the satellite access network, and generating a service
handover instruction based on the first processing rule.

Here, the service handover unit of the core network device
generates a service handover instruction based on the han-
dover scenario and service rule. According to the foregoing
example of the service rule, the service handover unit of the
core network device determines that it is handed over from
Video Class 3 to Voice Class 3.

The service handover instruction may include the con-
nectivity type being satellite access and Voice Class 3.

Step 307: synchronizing, by the core network device, the
service handover instruction to the voice network device.

Here, the service handover unit of the core network device
synchronizes the service handover instruction to the voice
network device.

Step 308: synchronizing, by the voice network device, the
service handover instruction to the media service platform.

Step 309: synchronizing, by the core network device, the
service handover instruction to the terminal.

Here, the service handover unit of the core network device
synchronizes the service handover instruction to the termi-
nal.

Here, it is to be noted that the execution order of the step
307 and the step 309 is not limited to the above, the step 309
can be executed before the step 307, or the step 307 and the
step 309 can be executed simultaneously, the present
embodiment does not limit this.

Step 310: performing audio and video calls among the
terminal, voice network device and media service platform
by using the handed over media type and rate rating Voice
Class 3.

Figure 5:
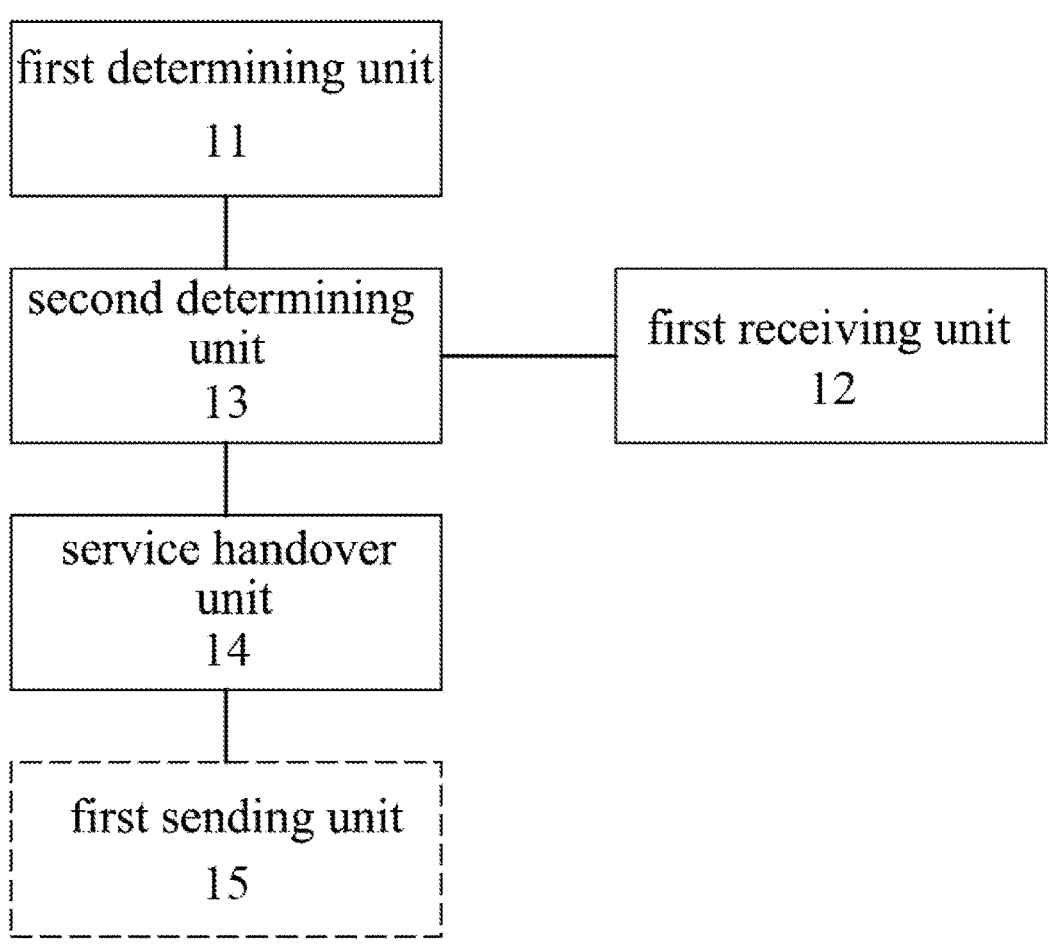
FIG. 5 is a first schematic structural diagram of a converged network service continuity apparatus according to an embodiment of the present disclosure.

An embodiment of the present disclosure further provides
a converged network service continuity apparatus. FIG. 5 is
a first schematic structural diagram of a converged network
service continuity apparatus according to an embodiment of
the present disclosure. As shown in FIG. 5, the apparatus
includes: a first determining unit 11, a first receiving unit 12,
a second determining unit 13, and a service handover unit
14; where the first determining unit 11 is configured to determine a
service rule corresponding to a terminal; where the
service rule includes an audio and/or video service
processing rule with at least one of a fixed access
network, a mobile access network and a satellite access
network as a handover target;

the first receiving unit 12 is configured to receive an
access handover event initiated by the terminal or a
network device;

the second determining unit 13 is configured to determine
a first handover target corresponding to the access
handover event when the first receiving unit receives
the access handover event initiated by the terminal or
the network device, and to determine a first processing
rule for the first handover target based on the service
rule;

the service handover unit 14 is configured to perform
service handover processing according to the first pro-
cessing rule.

In some optional embodiments of the present disclosure,
the apparatus further includes a first sending unit 15.

The service handover unit 14 is configured to generate a
service handover instruction according to the first processing
rule. The first sending unit sends the service handover
instruction to the voice network device and sends the service
handover instruction to the terminal.

In some optional embodiments of the present disclosure,
the first receiving unit 12 is further configured to receive
setting information from the terminal via the voice network
device, where the setting information includes at least one of
the following information: a set of first voice communica-
tion capability ratings characterizing that users can accept, a
set of first video communication capability ratings charac-
terizing that users can accept, priority information of voice
and video communication capability ratings, and informa-
tion characterizing whether an access type is maintained.

The first determining unit 11 is configured to obtain
connectivity-related information of the terminal; where the
connectivity-related information includes connectivity types
and connectivity rate information corresponding to the con-
nectivity types; determine the service rule based on the
connectivity-related information and the setting informa-
tion.

In some optional embodiments of the present disclosure,
the set of first voice communication capability ratings
includes one or more voice communication capability rat-
ings;

a voice communication capability supported by the ter-
minal is pre-divided into multiple voice communica-
tion capability ratings.

In some optional embodiments of the present disclosure,
the set of first video communication capability ratings
includes one or more video communication capability
ratings;

a video communication capability supported by the ter-
minal is pre-divided into multiple video communica-
tion capability ratings.

In some optional embodiments of the present disclosure,
the connectivity types include: a fixed access network con-
nection, a mobile access network connection or a satellite
access network connection.

In some optional embodiments of the present disclosure,
the first determining unit 11 is configured to determine the
following processing rules based on the connectivity type,
the connectivity rate information corresponding to the con-
nectivity type, and the setting information:

audio communication capability ratings or video commu-
nication capability ratings when a handover target is a
fixed access network;

audio communication capability ratings or video commu-
nication capability ratings when a handover target is a
mobile access network;

audio communication capability ratings or video commu-
nication capability ratings when a handover target is a
satellite access network.

In some optional embodiments of the present disclosure, the service handover instruction at least includes a first audio communication capability rating or a first video communication capability rating corresponding to the first handover target; where the first audio communication capability rating or the first video communication capability rating is used to instruct a media service platform and the terminal to communicate.

In the present disclosure embodiment, the converged network service continuity apparatus is applied in the core network device. The first determining unit 11, the second determining unit 13 and the service handover unit 14 in the apparatus can be implemented by a central processing unit (CPU), a digital signal processor (DSP), a microcontroller unit (MCU) or a field-programmable gate array (FPGA) in practical applications. The first receiving unit 12 and the first sending unit 15 in the apparatus can be implemented by communication modules (including a basic communication suite, an operating system, a communication module, a standardized interface and a protocol, etc.) and a transceiver antenna in practical application.

Figure 6:
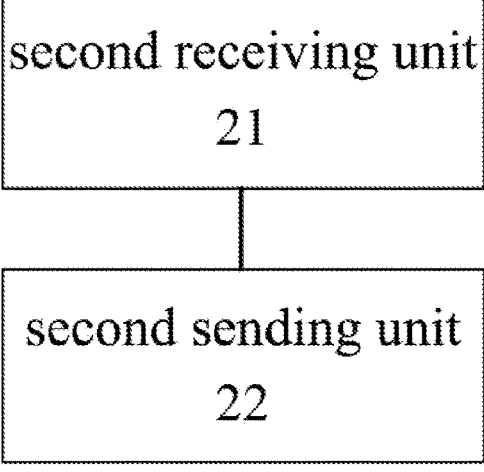
FIG. 6 is a second schematic structural diagram of a converged network service continuity apparatus according to an embodiment of the present disclosure.

An embodiment of the present disclosure further provides a converged network service continuity apparatus. FIG. 6 is a second schematic structural diagram of a converged network service continuity apparatus according to an embodiment of the present disclosure. As shown in FIG. 6, the apparatus includes a second receiving unit 21 and a second sending unit 22; where the second receiving unit 21 is configured to receive setting information from a terminal, where the setting information includes at least one of the following information: a set of first voice communication capability ratings characterizing that users can accept, a set of first video communication capability ratings characterizing that users can accept, priority information of voice and video communication capability ratings, and information characterizing whether an access type is maintained; the setting information is used to determine a service rule for guiding service handover processing; the second sending unit 22 is further configured to send the setting information to a core network device.

In some optional embodiments of the present disclosure, the second receiving unit 21 is further configured to receive a service handover instruction from the core network device.

The second sending unit 22 is further configured to send the service handover instruction to a media service platform.

Figure 7:
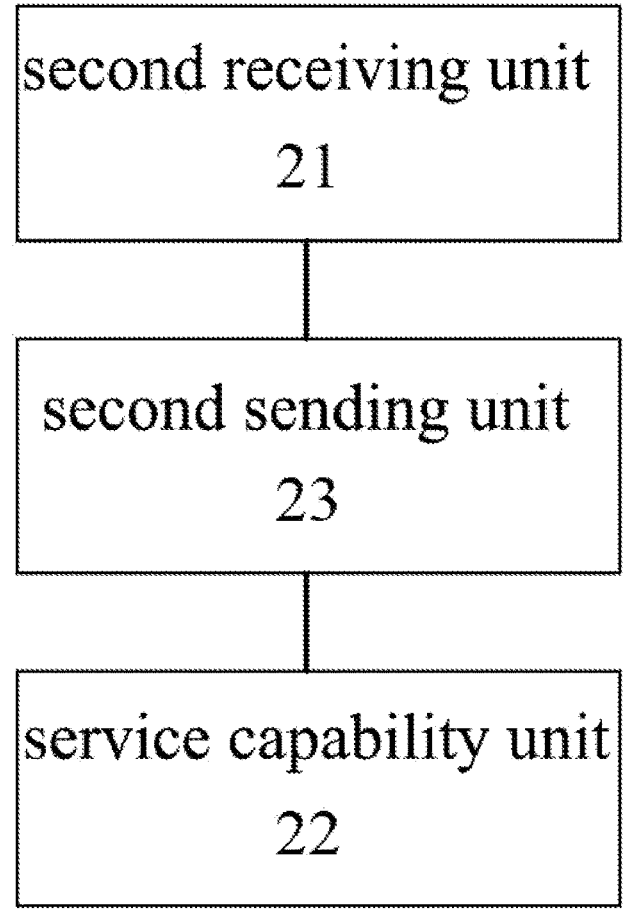
FIG. 7 is a third schematic structural diagram of a converged network service continuity apparatus according to an embodiment of the present disclosure.

In some optional embodiments of the present disclosure, as shown in FIG. 7, the apparatus further includes a service capability unit 23. The service capability unit 23 is configured to divide a voice communication capability into multiple voice communication capability ratings and divide a video communication capability into multiple video communication capability ratings based on a media type and a rate rating before the second receiving unit 21 receives the setting information from the terminal.

In some optional embodiments of the present disclosure, the set of first voice communication capability ratings includes one or more voice communication capability ratings;

the set of first video communication capability ratings includes one or more video communication capability ratings.

In some optional embodiments of the present disclosure, the service rule includes the following processing rules:

audio communication capability ratings or video communication capability ratings when a handover target of the terminal is a fixed access network;

audio communication capability ratings or video communication capability ratings when a handover target of the terminal is a mobile access network;

audio communication capability ratings or video communication capability ratings when a handover target of the terminal is a satellite access network.

In some optional embodiments of the present disclosure, the service handover instruction at least includes: when the handover target of the terminal is a first handover target, a first audio communication capability rating or a first video communication capability rating corresponding to the first handover target; where the first audio communication capability rating or the first video communication capability rating corresponding to the first handover target is used to instruct the media service platform to communicate.

In the present embodiment, the converged network service continuity apparatus is applied to the voice network device. The service capability unit 23 in the apparatus can be implemented by CPU, DSP, MCU or FPGA in practical applications; the second receiving unit 21 and the second sending unit 22 in the apparatus can be implemented by communication modules (including a basic communication suite, an operating system, a communication module, a standardized interface and a protocol, etc.) and a transceiver antenna in practical application.

It is to be noted that the converged network service continuity apparatus provided by the above embodiments is only exemplified by the division of the above program modules when performing converged network service continuity processing. In practical application, the above processing and allocation may be completed by different program modules as needed, that is, the internal structure of the network node is divided into different program modules to complete all or part of the above-described processing. In addition, the embodiments of the converged network service continuity apparatus and the converged network service continuity method provided by the embodiments belong to the same concept, and the detailed implementation processes thereof are detailed in the method embodiments and are not repeated here.

Figure 8:
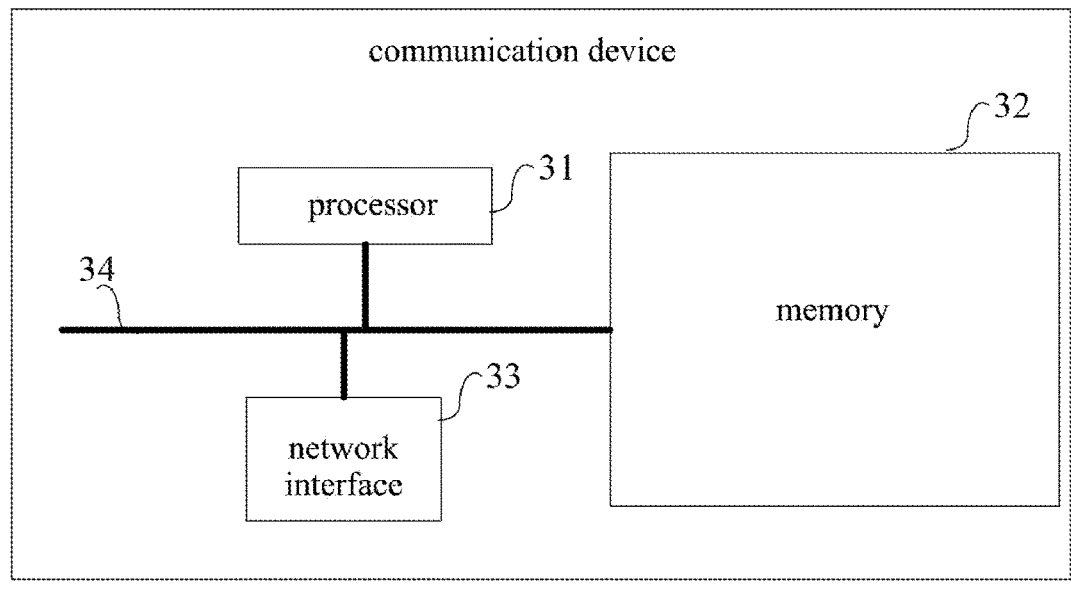
FIG. 8 is a schematic structural diagram showing hardware of a communication device according to an embodiment of the present disclosure.

An embodiment of the present disclosure further provides a communication device. The communication device may be the core network device or voice network device in the foregoing embodiments. FIG. 8 is a schematic structural diagram of hardware of a communication device according to an embodiment of the present disclosure. As shown in FIG. 8, the communication device includes a memory 32, a processor 31, and a program stored in the memory 32 and capable of running on the processor 31. The processor 31 is configured to execute the program to implement the steps in the converged network service continuity method applied to the core network device in the embodiments of the present disclosure, or, to implement the steps in the converged network service continuity method applied to the voice network device in the embodiments of the present disclosure.

Optionally, the communication device further includes one or more network interfaces 33. It is to be understood that various components of the communication device are coupled together through a bus system 34. It is to be understood that the bus system 34 is configured to implement the connection communication between these components. The bus system 34 further includes a power bus, a control bus and a status signal bus in addition to a data bus. However, for clarity of illustration, the various buses are labeled as the bus system 34 in FIG. 8.

It is to be understood that the memory 32 may be a volatile memory or a non-volatile memory, or may include both a volatile memory and a non-volatile memory. Herein, the non-volatile memory may be a Read Only Memory (ROM), a Programmable ROM (PROM), an Erasable PROM (EPROM), an Electrically EPROM (EEPROM), a Ferromagnetic Random Access Memory (FRAM), a Flash Memory, a magnetic surface memory, an optical disk, or a Compact Disc-ROM (CD-ROM). The magnetic surface memory may be a magnetic disk memory or a magnetic tape memory. The volatile memory may be a Random Access Memory (RAM), which is used as an external cache. By way of example, but not limitation, many forms of RAM are available, such as a Static RAM (SRAM), a Synchronous SRAM (SSRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). The memory 32 described in the embodiments of the present disclosure is intended to include, but is not limited to, these and any other suitable types of memory.

The methods disclosed in the embodiments of the present disclosure described above may be applied to the processor 31 or implemented by the processor 31. The processor 31 may be an integrated circuit chip with signal processing capabilities. In an implementation process, each step of the method may be completed by an integrated logical circuit of hardware in the processor 31 or one or more instructions in a software form. The above processor 31 may be a general-purpose processor, a DSP, or other programmable logic devices, discrete gate or transistor logic devices, discrete hardware components, or the like. Various methods, operations, and logic block diagrams disclosed in the embodiments of the present disclosure may be implemented or executed by the processor 31. The general-purpose processor may be a microprocessor or any conventional processor, etc. The operations of the method disclosed in combination with the embodiment of the present disclosure may be directly embodied as a hardware decoding processor for execution and completion, or a combination of hardware and software modules in the decoding processor for execution and completion. The software module may be located in a storage medium, which is located in the memory 32, and the processor 31 reads information from the memory 32, and completes the operations of the foregoing method in combination with hardware.

In an exemplary embodiment, the communication device may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, Microprocessors, or other electronic components, and is configured to execute the foregoing method.

In the exemplary embodiment, one embodiment of the present disclosure further provides a computer-readable storage medium, such as a memory 32 including a computer program, which may be executed by the processor 31 of the communication device to complete the operations of the foregoing method. The computer-readable storage medium may be the memory such as an FRAM, an ROM, a PROM, an EPROM, an EEPROM, a Flash Memory, a magnetic surface memory, an optical disk, or a CD-ROM, and may also be various devices including one or any combination of the above memories.

The computer-readable storage medium provided by the embodiments of the present disclosure stores therein a computer program, where the computer program is configured to be executed by a processor to implement the steps in the converged network service continuity method applied to the core network device in the embodiments of the present disclosure, or, to implement the steps in the converged network service continuity method applied to the voice network device in the embodiments of the present disclosure.

The methods disclosed in several method embodiments provided in the present disclosure may be arbitrarily combined without conflict to obtain a new method embodiment.

The characteristics disclosed in several product embodiments provided in the present disclosure may be arbitrarily combined without conflict to obtain a new product embodiment.

The characteristics disclosed in the several method or device embodiments provided in the present disclosure may be arbitrarily combined without conflict to obtain a new method embodiment or device embodiment.

In the several embodiments provided in the present disclosure, it is to be understood that the disclosed device and method may be implemented in other manners. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection through some interfaces, devices or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, function units in the embodiments of the present disclosure may be integrated into a processing unit, each unit may also serve as an independent unit and two or more than two units may also be integrated into a unit. The integrated unit may be implemented in a hardware form and may also be implemented in form of hardware and software function unit.

Those of ordinary skill in the art can understand that all or part of the operations of the above method embodiments may be completed by a related hardware instructed by program instructions. The foregoing program may be stored in a computer-readable storage medium. When the program is executed, the operations of the above method embodiments are performed. The foregoing storage medium includes: various media capable of storing program codes such as a mobile storage device, an ROM, an RAM, a magnetic disk, or an optical disk.

Alternatively, the integrated unit of the present disclosure may also be stored in a computer-readable storage medium if being implemented in the form of a software functional module and sold or used as a standalone product. Based on such an understanding, the technical solutions of the embodiments of the present disclosure substantially or parts making contributions to the related art may be embodied in form of software product, and the computer software product is stored in a storage medium, including a plurality of instructions configured to enable a computer device (which may be a personal computer, a server, a network device or the like) to execute all or part of the operations of the method in each embodiment of the present disclosure. The foregoing storage medium includes: various media capable of storing program codes such as a mobile storage device, an ROM, an RAM, a magnetic disk, or an optical disk.

The above is only the specific implementation of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subject to the scope of protection of the claims.

What is claimed is:

1. A converged network service continuity method, comprising:

determining, by a core network device, a service rule corresponding to a terminal; wherein the service rule comprises an audio and/or video service processing rule with at least one of a fixed access network, a mobile access network and a satellite access network as a handover target;

determining, by the core network device, when the core network device receives an access handover event initiated by the terminal or a network device, a first handover target corresponding to the access handover event, determining a first processing rule for the first handover target based on the service rule, and performing service handover processing according to the first processing rule;

wherein the performing the service handover processing according to the first processing rule, comprises:

generating, by the core network device, a service handover instruction, based on the first processing rule, sending the service handover instruction to a voice network device, and sending the service handover instruction to the terminal;

wherein the determining, by the core network device, the service rule corresponding to the terminal, comprises:

receiving, by the core network device, setting information from the terminal via the voice network device, wherein the setting information comprises at least one of the following information: a set of first voice communication capability ratings characterizing that users accept, a set of first video communication capability ratings characterizing that users accept, priority information of voice and video communication capability ratings, and information characterizing whether an access type is maintained;

obtaining, by the core network device, connectivity-related information of the terminal; wherein the connectivity-related information comprises connectivity types and connectivity rate information corresponding to the connectivity types;

determining, by the core network device, the service rule based on the connectivity-related information and the setting information.

2. The method according to claim 1, wherein the set of first voice communication capability ratings comprises one or more voice communication capability ratings;

a voice communication capability supported by the terminal is pre-divided into multiple voice communication capability ratings.

3. The method according to claim 1, wherein the set of first video communication capability ratings comprises one or more video communication capability ratings;

a video communication capability supported by the terminal is pre-divided into multiple video communication capability ratings.

4. The method according to claim 1, wherein the connectivity types comprise: a fixed access network connection, a mobile access network connection or a satellite access network connection.

5. The method according to claim 1, wherein the determining, by the core network device, the service rule based on the connectivity-related information and the setting information, comprises:

determining, by the core network device, the following processing rules based on the connectivity type, the connectivity rate information corresponding to the connectivity type, and the setting information:

audio communication capability ratings or video communication capability ratings when a handover target is a fixed access network;

audio communication capability ratings or video communication capability ratings when a handover target is a mobile access network;

audio communication capability ratings or video communication capability ratings when a handover target is a satellite access network.

6. The method according to claim 5, wherein the service handover instruction at least comprises a first audio communication capability rating or a first video communication capability rating corresponding to the first handover target; the first audio communication capability rating or the first video communication capability rating is used to instruct a media service platform and the terminal to communicate.

7. A communication device, comprising: a memory, a processor, and a program stored in the memory and capable of running on the processor; wherein the processor is configured to execute the program to implement:

determining a service rule corresponding to a terminal; wherein the service rule comprises an audio and/or video service processing rule with at least one of a fixed access network, a mobile access network and a satellite access network as a handover target;

determining, when receiving an access handover event initiated by the terminal or a network device, a first handover target corresponding to the access handover event, determining a first processing rule for the first handover target based on the service rule, and performing service handover processing according to the first processing rule;

wherein when performing the service handover processing according to the first processing rule, the processor is configured to execute the program to implement:

generating a service handover instruction, based on the first processing rule, sending the service handover instruction to a voice network device, and sending the service handover instruction to the terminal;

wherein when determining the service rule corresponding to the terminal, the processor is configured to execute the program to implement:

receiving setting information from the terminal via the voice network device, wherein the setting information comprises at least one of the following information: a set of first voice communication capability ratings characterizing that users accept, a set of first video communication capability ratings characterizing that users accept, priority information of voice and video communication capability ratings, and information characterizing whether an access type is maintained;

obtaining connectivity-related information of the terminal; wherein the connectivity-related information comprises connectivity types and connectivity rate information corresponding to the connectivity types;

determining the service rule based on the connectivity-related information and the setting information.

8. The communication device according to claim 7, wherein the set of first voice communication capability ratings comprises one or more voice communication capability ratings;

a voice communication capability supported by the terminal is pre-divided into multiple voice communication capability ratings.

9. The communication device according to claim 7, wherein the set of first video communication capability ratings comprises one or more video communication capability ratings;

a video communication capability supported by the terminal is pre-divided into multiple video communication capability ratings.

* * * * *